(12) United States Patent
Dai

(10) Patent No.: US 12,039,274 B2
(45) Date of Patent: Jul. 16, 2024

(54) ENTITY RECOGNITION METHOD AND DEVICE, DICTIONARY CREATING METHOD, DEVICE AND MEDIUM

(71) Applicant: BOE TECHNOLOGY GROUP CO., LTD., Beijing (CN)

(72) Inventor: Yafei Dai, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 521 days.

(21) Appl. No.: 17/299,023

(22) PCT Filed: Jan. 20, 2020

(86) PCT No.: PCT/CN2020/073155
§ 371 (c)(1),
(2) Date: Jun. 2, 2021

(87) PCT Pub. No.: WO2021/146831
PCT Pub. Date: Jul. 29, 2021

(65) Prior Publication Data
US 2022/0318509 A1    Oct. 6, 2022

(51) Int. Cl.
*G06F 17/00* (2019.01)
*G06F 40/242* (2020.01)
(Continued)

(52) U.S. Cl.
CPC .......... *G06F 40/295* (2020.01); *G06F 40/242* (2020.01); *G06F 40/30* (2020.01)

(58) Field of Classification Search
CPC ...... G06F 40/30; G06F 40/242; G06F 40/237; G06F 40/205; G06F 40/279;
(Continued)

(56) References Cited

U.S. PATENT DOCUMENTS

| | | | | |
|---|---|---|---|---|
| 10,699,077 | B2 * | 6/2020 | Mehdad | G06F 40/295 |
| 2017/0192958 | A1 * | 7/2017 | Misra | G06F 40/30 |
| 2020/0311196 | A1 * | 10/2020 | Xu | G06F 40/232 |

OTHER PUBLICATIONS

Geng, Dawei. "Clinical name entity recognition using conditional random field with augmented features." CCKS 2017 (2017): 61-68. (Year: 2017).*

* cited by examiner

*Primary Examiner* — Michael Ortiz-Sanchez
(74) *Attorney, Agent, or Firm* — HOUTTEMAN LAW LLC

(57) ABSTRACT

A recognition method and device of named entity, a creation method of dictionary of named entity, an electronic device, and a computer-readable medium. The method includes: obtaining target text; determining to-be-classified word and part-of-speech classification thereof in the target text according to CRF model, the CRF model including semantic function and template function; each template function being configured to provide a score for each character corresponding to each part-of-speech classification in the target text; the semantic function being configured to match at least part of word in the target text with a sememe in sememe library, and give a score of part-of-speech classification corresponding to a type attribute of the sememe in the sememe library for each character of the word when the word has a matched sememe; and determining the named entity in the target text according to the part-of-speech classification of the to-be-classified word.

20 Claims, 4 Drawing Sheets

(51) Int. Cl.
*G06F 40/295* (2020.01)
*G06F 40/30* (2020.01)

(58) Field of Classification Search
CPC ...... G06F 40/289; G06F 40/295; G06F 40/20; G06F 40/10; G06F 16/24575
See application file for complete search history.

ENTITY RECOGNITION METHOD AND DEVICE, DICTIONARY CREATING METHOD, DEVICE AND MEDIUM

FIELD OF THE INVENTION

Embodiments of the disclosure relate to the field of computer technologies, and in particular, to a recognition method and device of named entity, a creation method of a dictionary of the named entity, an electronic device, and a computer-readable medium.

BACKGROUND

With the development of the technology, an amount of network data is increased explosively. The network data has the characteristics of large scale, heterogeneous diversity, loose organizational structure and the like, so that how to extract required knowledge from a large amount of network data becomes a problem to be solved urgently.

SUMMARY

Embodiments of the disclosure provide a recognition method and device of named entity, a creation method for a dictionary of the named entity, an electronic device, and a computer-readable medium.

In a first aspect, an embodiment of the present disclosure provides a recognition method of named entity, including: obtaining a target text; determining a to-be-classified word (or phrase) and a part-of-speech classification of the to-be-classified word (or phrase) in the target text according to a preset conditional random field model, wherein the conditional random field model includes a plurality of scoring functions, each scoring function including an sememe function and at least one template function; each template function is configured to provide a score for each character (or word) corresponding to each part-of-speech classification in the target text; the sememe function is configured to match at least part of a word (phrase) in the target text with a sememe in a preset sememe library, and give a score of part-of-speech classification corresponding to a type attribute of the sememe in the sememe library for each character of the word when the word has a matched sememe; the conditional random field model is configured to determine the part-of-speech classification of each character according to a total score of each character corresponding to each part-of-speech classification in the target text, wherein the total score of any character or word corresponding to any part-of-speech classification is a sum of the scores of the character corresponding to the part-of-speech classification given by all the scoring functions; the conditional random field model is further configured to determine a plurality of characters having the same part-of-speech classification as a to-be-classified word (or phrase), and determine the part-of-speech classification of each to-be-classified word as the part-of-speech classification of any characters in the to-be-classified word; and determining the named entity in the target text according to the part-of-speech classification of the to-be-classified word (or phrase).

In some embodiments, each template function has a feature template and a plurality of feature functions, each feature template specifies an extraction position having a determined positional relationship with a current position, and any two of the template functions have different feature templates; and wherein each template function is configured to successively enable each character in the target text to be at the current position; when any character or word is at the current position, each feature function is configured to judge a matching status of the character or word at the extraction position with a preset character (or word) specified by the feature function, to give a preset score corresponding to a preset part-of-speech classification to the character (or word) at the current position.

In some embodiments, the extraction position specified by each feature template is any one of: C-2, C-1, C0, C1, C2, C-2C-1, C-1C0, C0C1, C1C2, C-3C-2C-1, C-2C-1C0, C-1C0C1, C0C1C2, and C1C2C3, wherein Cn represents a position of the nth word after the current position, C-n represents a position of the nth word before the current position, and n is any one of 0, 1, 2, and 3.

In some embodiments, the conditional random field model may include: a scoring function configured to judge whether a character is a punctuation, a scoring function configured to judge whether a character is a digit, a scoring function configured to judge whether a character is an alphabet, a scoring function configured to judge whether a character is beginning of a sentence, a scoring function configured to judge whether a character is ending of a sentence, a scoring function configured to judge whether a character is a common suffix, and a scoring function configured to judge whether a character is a common prefix.

In some embodiments, determining the part-of-speech classification of each character (or word) according to a total score of each character (or word) corresponding to each part-of-speech classification in the target text comprises: determining a maximum total score in all the total scores corresponding to each character (or word) in the target text; and using the part-of-speech classification corresponding to the maximum total score as the part-of-speech classification of the character (or word).

In some embodiments, the conditional random field model further comprises a word segmentation function configured to segment a plurality of to-be-matched words (or phrases) from the target text; and a sememe function configured to match each to-be-matched word (or phrase) with the sememe in a preset sememe library, and to give a score of the part-of-speech classification corresponding to the type attribute of the sememe in the sememe library for each character (or word) of each to-be-matched word (or phrase) when the to-be-matched word (or phrase) has the matched sememe.

In some embodiments, the step of determining the named entity in the target text according to the part-of-speech classification of the to-be-classified word (or phrase) comprises: extracting the to-be-classified word (or phrase) of part-of-speech classification in a predetermined field as the named entity.

In some embodiments, the predetermined field is a medical field.

In some embodiments, the step of obtaining the target text includes: obtaining the target text from at least one of: a medical database, a medical website, a medical thesis, a medical textbook, and a medical record.

In some embodiments, after the step of determining the named entity in the target text according to the part-of-speech classification of the to-be-classified word (or phrase), the method further includes: outputting the named entity.

In some embodiments, before the step of determining the to-be-classified word (or phrase) and the part-of-speech classification of the to-be-classified word (or phrase) in the target text according to the preset conditional random field model, the method further includes: obtaining a training text, wherein each character (or word) in the training text has a preset part-of-speech classification; and training the conditional random field model by using the training text.

In a second aspect, an embodiment of the present disclosure provides a creation method of a dictionary of named entity, including: determining a plurality of target texts; determining a plurality of named entities in the plurality of target texts according to any recognition method of named entity as set forth above; and creating the dictionary of named entity according to the plurality of named entities.

In a third aspect, an embodiment of the present disclosure provides an recognition device of named entity, including: an obtaining module, configured to obtain a target text; a classification module, configured to determine a to-be-classified word (or phrase) and a part-of-speech classification of the to-be-classified word (or phrase) in the target text according to a preset conditional random field model, wherein the conditional random field model includes a plurality of scoring functions, each scoring function including an sememe function and at least one template function; each template function is configured to provide a score for each character (or word) corresponding to each part-of-speech classification in the target text; the sememe function is configured to match at least part of a word (or phrase) in the target text with a sememe in a preset sememe library, and give a score of part-of-speech classification corresponding to a type attribute of the sememe in the sememe library for each character (or word) of the word (or phrase) when the word (or phrase) has a matched sememe; the conditional random field model is configured to determine the part-of-speech classification of each character (or word) according to a total score of each character corresponding to each part-of-speech classification in the target text, wherein the total score of any character (or word) corresponding to any part-of-speech classification is a sum of the scores of the character (or word) corresponding to the part-of-speech classification given by all the scoring functions; the conditional random field model is further configured to determine a plurality of characters (or words) having the same part-of-speech classification as a to-be-classified word (or phrase), and determine the part-of-speech classification of each to-be-classified word (or phrase) as the part-of-speech classification of any characters (or words) in the to-be-classified word (or phrase); and a determination module, configured to determine a named entity in the target text according to the part-of-speech classification of the to-be-classified word (or phrase).

In some embodiments, the determination module is configured to extract the to-be-classified word (or phrase) of the part-of-speech classification in a predetermined field as the named entity.

In a fourth aspect, an embodiment of the present disclosure provides an electronic device, including: one or more processors; and a memory, storing one or more programs thereon, wherein when executed by the one or more processors, the one or more programs cause the one or more processors to implement any recognition method of named entity as set forth above.

In a fifth aspect, an embodiment of the present disclosure provide a computer-readable medium, storing a computer program thereon, wherein when executed by a processor, the program implements any recognition method of named entity as set forth above.

BRIEF DESCRIPTION OF THE DRAWINGS

Accompanying drawings are provided for further understanding of the embodiments of the disclosure. The accompanying drawings constitute a part of this specification, illustrate the disclosure together with the embodiments and are not intended to limit the disclosure. The above and further features and advantages will become more apparent to those skilled in the art through the description of the detail exemplary embodiments with reference to the accompanying drawings, in which.

DETAILED DESCRIPTION OF THE EMBODIMENTS

Figure 1:
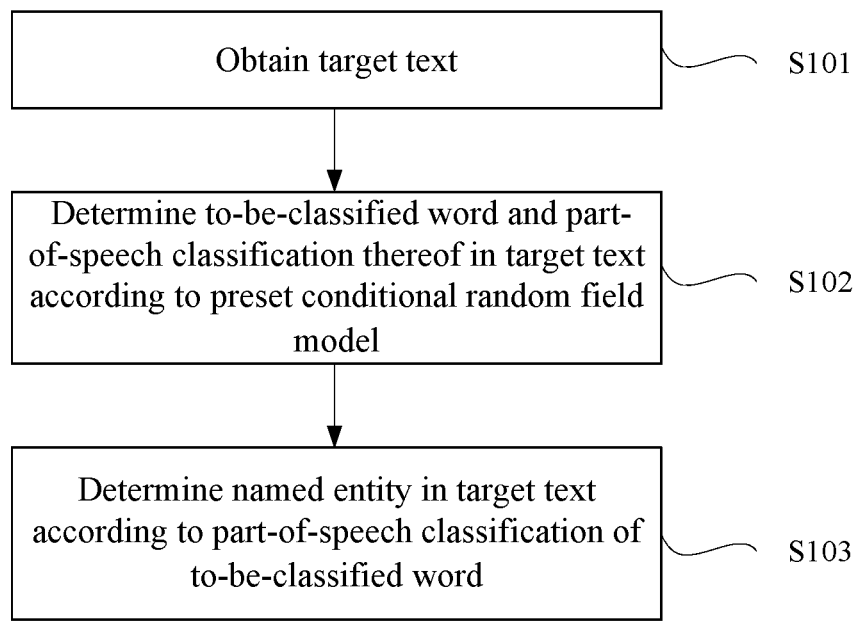
FIG. 1 is a flowchart illustrating a recognition method of named entity according to an embodiment of the present disclosure.

In order for those skilled in the art to better understand the technical solutions of the embodiments of the present disclosure, a recognition method and device of named entity, a creation method of a dictionary of the named entity, an electronic device, and a computer-readable medium in accordance with the embodiments of the present disclosure will be described in detail in conjunction with the accompanying drawings.

The embodiments of the present disclosure will be described fully hereinafter with reference to the accompanying drawings, but the embodiments as shown may be embodied in different forms and should not be construed as limited to the embodiments set forth herein. Rather, the embodiments are provided such that the disclosure becomes thorough and complete and those skilled in the art will fully understand the scope of the disclosure.

The embodiments of the disclosure may be described by way of idealized schematic illustrations with reference to plan and/or cross-sectional views of the present disclosure. Accordingly, the example illustrations may be modified in accordance with manufacturing techniques and/or tolerances.

The embodiments of the disclosure and features in the embodiments may be combined with each other if there is no conflict.

The terminology used in the disclosure is for the purpose of the description of the particular embodiments only and is not intended to be limitation of the disclosure. The term "and/or" as used in this disclosure includes any and all combinations of one or more of the associated items as listed herein. The singular forms "a (an)" and "the" as used in this disclosure are intended to include the plural forms as well, unless the context clearly indicates otherwise. The terms "comprises" and "consists of . . . . . .", as used in the disclosure, specify the presence of stated features, integers, steps, operations, elements, and/or components, but do not preclude the presence or addition of one or more other features, integers, steps, operations, elements, components, and/or groups thereof.

Unless otherwise specified, all terms (including technical and scientific terms) used in the disclosure have the same meaning as commonly understood by a person having ordinary skill in the art. It will be further understood that the terms, such as those defined in commonly used dictionaries, should be interpreted as having meanings in conformity with contexts in the related art and the background of the disclosure and will not be interpreted in an idealized or overly formal sense, unless expressly defined herein.

The embodiments of the disclosure are not limited to the embodiments as shown in the drawings, but include modifications of configurations formed based on manufacturing processes. Thus, regions illustrated in the figures have schematic properties, and shapes of the regions in the figures illustrate specific shapes of regions of elements but are not intended to have restrictive properties.

Description of Technical Terms

In the disclosure, unless otherwise specified, the technical terms hereafter should be understood in accordance with the following explanations:

"Text" refers to a collection of content that can represent a certain meaning in linguistics and mainly consists of words (also including other characters such as punctuation), such as a sentence, an article, a book, a word page, and the like, which may all be called a "text".

"Character", also called a graphic symbol, is the most basic unit constituting a text and specifically may be a Chinese character, a letter, a number, a symbol, a punctuation, and the like.

"Word" refers to "a set of characters" composed of "one letter (character)" or "a plurality of consecutive letters (characters)" and capable of representing a relatively independent meaning in linguistics.

"Phrase" refers to an on consisting of one or more words forming a grammatical constituent of a sentence, or an expression whose meanings cannot be inferred from the meanings of the words that make it up.

"Sememe", is the most basic, not easily subdivided and the smallest semantic unit or the finest granularity of a "word" that can independently indicate a definite meaning, in linguistics. For example, although "human" is a very complex concept and is a collection of properties, it can also be considered as a sememe. In theory, all concepts can be decomposed into a wide variety of sememes, resulting in a limited set of sememes (a sememe library). Obviously, it should be understood that many sememes are also "named entities". For example, the relationship of different "words (named entities)" can be understood as a tree structure, the last branch of which cannot be subdivided and segmented and could be a sememe. For example, the creatures include animals including humans and animals (except for humans), and the fish belongs to animals; the fish is considered as a sememe because the fish cannot be subdivided. The sememe can solve the problem of word sense disambiguation, more particularly capture the relation between words in advance, and can better predict a way in which a next word appears following one word. The relation in the semantic sense contains richer semantics.

Medical field refers to a range of content all having high relevance to medical technologies, and more specifically may include content related to diseases (such as types of diseases, causes, symptoms, and treatments), content related to treatments (such as treatment methods, treatment devices, and treatment drugs) and the like, content related to prevention/exercise (such as prevention/exercise methods, treatment/exercise devices, and treatment/exercise drugs), and content related to specific concepts in medicine (such as doctors, medical organizations, and medical development histories).

Knowledge graph is a collection of data representing relationships of different entities and attributes of the entities. In the knowledge graph, the entities are regarded as nodes; connections between the entities, between the entities and the corresponding attributes, and between the attributes and the corresponding values are provided through edges, such that a structured and network-like database is formed.

In some related technologies, there is a need to extract key symptom information, examination means, and the like from a large segment of natural language text describing a disease. The effort and cost will be consumed too much in the case of manual extraction, and since the amount of data is too large and is continuously updated, the manual extraction is obviously unrealistic. Corpus information is necessarily noted in the case of machine extraction, such that a machine can learn rules in the corpus information and identify the key information. Taking human costs into account, the amount of data to be noted must not be very large. In this case, the performance of the deep learning algorithm may be lowered because the deep learning algorithm requires a large amount of noted data for the machine to understand it perfectly.

In a first aspect, there is provided a recognition method of named entity in an embodiment of the present disclosure.

The method according to the embodiment of the disclosure can be used to recognize at least part of named entities in a text and determine part-of-speech classifications of the named entities.

Referring to FIG. 1, the recognition method of the named entity according to the embodiment of the present disclosure can specifically include steps S101 to S103.

S101, obtaining a target text.

The text to be subsequently recognized, namely the target text, is obtained.

Herein, the specific manner of "obtaining" is various, as long as the target text can be obtained for subsequent processing.

For example, the target text for input can be obtained through input devices such as a mouse, a keyboard, a voice input unit, a character recognition unit, a scanning unit and the like. Alternatively, the target text may be directly read from a storage medium such as a predetermined hard disk and the like.

In some embodiments, the step (S101) may specifically include: crawling the target text from the network.

In other words, the target text can be crawled from content of the network (e.g., the network within a predetermined range) by crawler software.

For example, a specific target text may be obtained by crawling in the encyclopedic knowledge section of a certain website. For example, content in relation to an entry of encyclopedic knowledge named "name of diseases" in are crawled as the target text. Obviously, the entry of encyclopedic knowledge named "name of diseases" has the content mostly related to the named "disease", such as the alias names, etiology, treatment methods of the disease and the like.

Herein, the content of the target text may be "semi-structured". For example, the target text may be divided into a plurality of sections (e.g., paragraphs, chapters, etc.) according to subtitles such as alias names, etiology, treatment methods, and the like.

Of course, the specific form of target text is various. For example, the target text may also be non-structured data (e.g., an article without a subtitle).

In some embodiments, the target texts obtained in the step (S101) are target texts belonging to the same predetermined field.

In some ways, it can be ensured that the obtained target text is quite relevant to a specific field.

Specifically, the target texts obtained from a specific source may be restricted to ensure that the obtained target texts all belong to the same predetermined field. For example, when content of encyclopedia knowledge of a certain website is obtained as the target text by crawling, it may be restricted that only content of "medical encyclopedia knowledge" (which, for example, can be determined by a classification tag given by the website for the encyclopedia knowledge entries) is crawled as the target text of the medical field.

Of course, in the embodiment of the present disclosure, various data processing manners for obtaining and storing the target text can be conceived.

For example, when the target text is obtained by crawling, the webpage can be crawled by using a function of urllib in the Python language, and corresponding text content is obtained from the webpage (e.g., in HTML, or XML format) by means of Beautiful Soup framework and stored (e.g., the content of each webpage is stored as a file) as the target text.

S102, determining a to-be-classified word (or phrase) and a part-of-speech classification of the to-be-classified word (or phrase) in the target text according to a preset conditional random field model.

Herein the conditional random field model includes a plurality of scoring functions, the scoring functions including an sememe function and at least one template function; each template function is configured to provide a score for each character (or word) corresponding to each part-of-speech classification in the target text; the sememe function is configured to match at least part of a word (phrase) in the target text with a sememe in a preset sememe library, and give a score of part-of-speech classification corresponding to a type attribute of the sememe in the sememe library for each character (or word) of the word (or phrase) when the word (or phrase) has a matched sememe; the conditional random field model is configured to determine the part-of-speech classification of each character (or word) according to a total score of each character (or word) corresponding to each part-of-speech classification in the target text, wherein the total score of any character or word corresponding to any part-of-speech classification is a sum of the scores of the character or word corresponding to the part-of-speech classification given by all the scoring functions; the conditional random field model is further configured to determine a plurality of characters or words having the same part-of-speech classification as a to-be-classified word (or phrase), and determine the part-of-speech classification of each to-be-classified word (or phrase) as the part-of-speech classification of any characters (or word) in the to-be-classified word (or phrase).

In the step (S102), the preset Conditional Random Field (CRF) model is used to process the target text, so as to determine a score of each character (or word) in the target text corresponding to each part-of-speech classification (which can reflect the probability that each character or word belongs to each part-of-speech classification), and further to determine the part-of-speech classification of each character (or word) according to the score, wherein at least part of successive characters (or words) in the target text have the same part-of-speech classification and form the to-be-classified word (or phrase), and the to-be-classified word (or phrase) has the part-of-speech classification of any character (or word) in the to-be-classified word (or phrase) (because each character in the to-be-classified word or phrase has the same part-of-speech classification), thereby obtaining the named entity and the part-of-speech classification thereof.

Herein, the part-of-speech classification is used to indicate "properties" of a corresponding word (or phrase), and the part-of-speech classification of a character (or word) indicates "properties" of a word (or phrase) to which the character (or word) belongs, so that the part-of-speech classification corresponds to "type", "attribute", "tag", and the like of the word (or phrase). The specific type of the part-of-speech classification can be preset as required.

For example, when a named entity in the medical field is to be recognized, a part-of-speech classification, such as "Name of Disease", "Group of Disease", "Diseased Site", "Etiology", "Common Symptom", "Consultation Department", "propagation Route", "Physiological Index", "Examination Means" and "Treatment Means", may be set. For example, the word "gastritis" is classified by part-of-speech as "name of disease".

When a named entity in connection with another filed is to be recognized, a specific part-of-speech classification associated with another filed may also be set accordingly.

Of course, the part-of-speech classification may be set according to other content as differently required.

For example, the part-of-speech classifications may be determined based on linguistic attributes of words (or phrase). For example, the part-of-speech classifications may include "nouns", "verbs", "prepositions", "quantifiers", "adjectives" and the like.

Alternatively, the part-of-speech classification may be determined according to the meaning of the word (or phrase) in reality. For example, the part-of-speech classification may include "personal name", "place name", "organization name", "scientific concept", "name of disease", and the like.

Alternatively, the part-of-speech classification may also be determined according to the technical field to which the word (or phrase) belongs. For example, the part-of-speech classification may include "medical field", "industrial field", "construction field", and the like.

It should be understood that for the content that does not belong to the named entity to be recognized, specific part-of-speech classifications (e.g., adverbs, prepositions, and the like) can also be provided; however, from the perspective of reducing the complexity of the Conditional Random Field (CRF) model and saving the amount of computation, the content which does not belong to the named entity to be recognized can be classified as a part-of-speech classification of "non-entity".

For example, when a named entity in the medical field is to be recognized, in addition to the above part-of-speech classifications such as "name of disease", "group of disease", and the like, a part-of-speech classification of "non-entity" may be set, and all other words (or phrase) are considered to be the part-of-speech classifications of "non-entity".

Herein, "Conditional Random Field (CRF) model" is a discriminant probability model used for labeling or analyzing sequence data, such as labeling natural language characters or words (the target text).

In particular, the conditional random field model may include a plurality of scoring functions, each of which may calculate a score for each character (word) in the text belonging to a corresponding "possible type (part-of-speech classification)", the score representing a probability (but is not necessarily equal to the probability value) that the character (or word) belongs to the corresponding part-of-speech classification. Thus, the scoring function essentially determines a "likelihood" that the character (or word) belongs to each part-of-speech classification.

Furthermore, the conditional random field model can determine the part-of-speech classification of each character (or word) according to a total score of each character (or word) corresponding to each part-of-speech classification, and use successive characters (or words) having the same part-of-speech classification as a to-be-classified word (or phrase) to determine that the part-of-speech classification of the to-be-classified word (or phrase) is the part-of-speech classification of any character (or word) therein (the part-of-speech classifications of all characters in the to-be-classified word or phrase are necessarily the same).

Herein, the "total score" of each part-of-speech classification as set forth above means: each scoring function is capable of determining a score for at least part of the characters (or word) belonging to at least part of the part-of-speech classifications, such that the score for each character (or word) corresponding to each part-of-speech classification may be given by a plurality of scoring functions together, and thus for each part-of-speech classification of each character (or word), a "sum" of the scores given by all the scoring functions is the "total score" of the character (or word) corresponding to the part-of-speech classification.

The total score represents the probability that the conditional random field model, as a whole, judges the character (or word) belonging to the part-of-speech classification.

In some embodiments, the step of determining the part-of-speech classification of each character (or word) according to a total score of each character (or word) corresponding to each part-of-speech classification in the target text comprises: determining a maximum total score in all the total scores corresponding to each character (or word) in the target text; and using the part-of-speech classification corresponding to the maximum total score as the part-of-speech classification of the character or word.

As a feasible manner, the part-of-speech classification corresponding to the largest total score among the plurality of total scores of the part-of-speech classifications for each character (or word) may be used as the part-of-speech classification of the character (or word).

For example, for a text "a young child is more likely to suffer from chicken-pox", assuming that the conditional random field model has three score functions (two template functions and one sememe function, which will be described in detail later) and that the part-of-speech classification has three types which are "name of disease", "group of disease" and "non-entity", processes of obtaining scores according to the conditional random field model and determining a to-be-classified word (or phrase) and a part-of-speech classification according to the scores could be shown in a table below:

| Characters (Words) | young | child | more | like- | ly | suffer from | children- | pox |
|---|---|---|---|---|---|---|---|---|
| A score corresponding to "name of disease" given by Template function 1 | 1 | 1 | 2 | 0 | 1 | 1 | 4 | 6 |
| A score corresponding to "group of disease" given by Template function 1 | 3 | 5 | 1 | 1 | 2 | 1 | 0 | 1 |
| A score corresponding to "non-entity" given by Template function 1 | 1 | 1 | 5 | 6 | 6 | 1 | 0 | 1 |
| A score corresponding to "name of disease" given by Template function 2 | 2 | 3 | 1 | 0 | 2 | 1 | 5 | 5 |
| A score corresponding to "group of disease" given by Template function 2 | 3 | 8 | 3 | 2 | 3 | 1 | 0 | 0 |
| A score corresponding to "non-entity" given by Template function 2 | 1 | 3 | 5 | 5 | 3 | 5 | 2 | 3 |
| A score corresponding to "name of disease" given by Sememe function | No scoring | No scoring | No scoring | No scoring | No scoring | No scoring | 5 | 5 |
| A score corresponding to "group of disease" given by Sememe function | 5 | 5 | No scoring | No scoring | No scoring | No scoring | No scoring | No scoring |
| A total score of "name of disease" | 3 | 4 | 3 | 0 | 3 | 2 | 14 | 16 |
| A total score of "group of disease" | 11 | 18 | 4 | 3 | 5 | 2 | 0 | 1 |
| A total score of "non-entity" | 2 | 4 | 10 | 11 | 9 | 6 | 2 | 4 |
| Part-of-speech classification corresponding to maximum total score | group of disease | group of disease | non-entity | non-entity | non-entity | non-entity | name of disease | name of disease |
| Part-of-speech classification of characters (words) | group of disease | group of disease | non-entity | non-entity | non-entity | non-entity | name of disease | name of disease |
| To-be-classified words | young child | | more likely (to) suffer from | | | | children-pox | |
| Part-of-speech classification of to-be-classified words | group of disease | | non-entity | | | | name of disease | |

It should be understood that the specific score functions, specific score values and specific part-of-speech classifications, etc., in the above table are illustrative only and are not limiting on the practical manner of the embodiments of the present disclosure. In particular, the specific score is not usually an integer value as above. The above table is only intended to schematically indicate the way of determining the to-be-classified word (or phrase) and the part-of-speech classification according to the scoring.

In the conditional random field model of the embodiment of the disclosure, the scoring function is divided into the template function and the sememe function.

Herein, the template function is a scoring function used in conditional random field models of some related technologies, and each template function is used for giving a score belonging to each part-of-speech classification for each character (or word) in the target text.

In some embodiments, each template function has a feature template and a plurality of feature functions, each feature template specifies an extraction position having a determined positional relationship with a current position, and any two of the template functions have different feature templates; each template function is configured to successively enable each character in the target text to be at the current position; when any character or word is at the current position, each feature function is configured to judge a matching status of the character or word at the extraction position with a preset character (or word) specified by the feature function, to give a preset score corresponding to a preset part-of-speech classification to the character or word at the current position.

In other words, the template function corresponds to the feature template, each feature template specifies an "extraction position" satisfying a certain positional relationship with a "current position", and the "extraction position" of a different template function has different way of settings.

Thereby, each template function will successively treat each of characters (or words) in the target text as a "current position", or "traverse" each of characters (or words) in the target text with the current position of the feature template.

When a certain character (or word) in the target text is at the "current position", the character (or word) at the "extraction position" in the target text can be found according to the feature template.

Specifically, assuming that the "extraction position" specified by the feature template of a certain template function is "a previous position of the current position (C-1)", the traversal process for the text "a young child is more likely to suffer from chicken-pox" will be as follows:

when the current position is "child", the extraction position is the word "young";

when the front position is "more", the extraction position is the word "child";

when the current position is "likely", the extraction position is the word "more";

and so on.

Obviously, the part-of-speech classification of each character (or word) in the text has a certain "probabilistic" relationship with the characters (words) before and after it. For example, the first word following two words "suffer from" is usually (but not absolutely) the first word of a name of disease. In other words, there is a high probability that the part-of-speech classification of the word following words "suffer from" is a "name of disease".

Therefore, during the above "traversal", when the current positions corresponds to different words (e.g., when corresponding to the above "child", "more" and "likely", respectively), the words at the extraction positions will form an "input sequence" (e.g., the above "young", "child", and "more"). According to the input sequence, the template function can "predict" the probability of an output sequence in various situations, i.e., predict the sequence formed by part-of-speech classification of the words at the current positions.

More specifically, each template function includes a plurality of feature functions.

Herein, the feature functions include "preset characters", "preset scores", and "preset part-of-speech classifications", which can be obtained by training.

When the current position is any character (or word), each feature function judges whether the characters (or word) at the "extraction positions" are matched with the "preset characters (or word)" of the feature function (the characters or words are the same). If matched, a "preset score" will be given for the "preset part-of-speech classification" the characters (or word) at the current positions. Obviously, each template function gives a total score for each part-of-speech classification of each character (or word), which is a sum of preset scores given for the respective preset part-of-speech classifications by all the feature functions.

For example, for a feature template in which the extraction position is 1 and 2 placeholders of current position, its corresponding feature function may include:

The feature function 1, having preset characters of "suffer from" and a preset part-of-speech classification of "name of disease", configured to give a certain score of the part-of-speech classification corresponding to the "name of disease" for the character (or word) at the current position when the two words prior to the current position are "suffer from" (because "suffering from (the name of a disease)" is a common description).

The feature function 2, having preset characters of "group is" and a preset part-of-speech classification of "disease group", configured to give a certain score of the part-of-speech classification corresponding to the "disease group" for the character (or word) at the current position when the two words prior to the current position are "group is" (because "the diseased group is (a certain group)" is a common description).

It should be understood that the above relationship between characters (words) and part-of-speech classifications is only "probabilistic" and not necessary. For example, "suffer from multiple diseases" is also a common description. In other words, the first word following "suffer from" may also be "non-entity".

Therefore, the above template function may further include a feature function 3, configured to give a certain score of part-of-speech classification corresponding to the "non-entity" for the character (or word) at the current position when the two words prior to the current position are "suffer from".

Specifically, each feature function itself may be configured only to give an original probability of 0 (not matched) or 1 (matched) depending on whether the character (or word) at the extraction position is matched with the preset character (or word). In training, different feature functions may obtain different weights (which will be described in detail hereinafter), and thus the preset score of the feature function is a product of its original probability and weight.

Herein, the above weight may be a "negative number" which is used to indicate that the probability that the character (or word) at the current position belongs to the preset part-of-speech classification is negative when a preset character (or word) is at the extraction position. In other words, the preset character (or word) represents that the character (or word) at the current position "impossibly" belongs to the preset part-of-speech classification.

Of course, it should be understood that, since the original probability of the unmatched feature function is 0, the feature function may be deemed not to score the preset part of speech classification, or be deemed to score the preset part-of-speech classification by 0, when the feature function is unmatched. Therefore, the actual score of the preset part-of-speech classification is not affected.

In conclusion, the weight of a certain feature function actually represents an amount of "probabilistic" of the preset character (or word) and the preset part-of-speech classification in the feature function, that is, the probability that the character (or word) at the current character (or word) belongs to the preset part-of-speech classification when the character (or word) at the extraction position is the preset character (or word).

It can be seen that each template function of the conditional random field model corresponds to a conditional probability distribution model P (Y|X), which represents, under a condition of a given set of input random variables X, a Markov random field of another set of output random variables Y. In other words, the template function is characterized in that it is assumed that the output random variables constitute a Markov random field, and therefore, the specific formula of the template function can be as follows:

$$P(I/O) = \frac{1}{Z(O)} \prod_i e^{\sum_k \lambda_k f_k(O, I_{i-1}, I_i, i)}$$

wherein i represents a serial number of current position; k represents a serial number of feature function; f represents an original probability (0 or 1) given by the feature function; λ represents a weight of the feature function; Z(O) is used to achieve normalization with a result of a probability value between 0-1 (which is optional, of course); and P(I/O) represents a probability (score) of a hidden-state sequence I determined under a given observation sequence O.

In some embodiments, the extraction position specified by each feature template can be any one of:

C-2, C-1, C0, C1, C2, C-2C-1, C-1C0, C0C1, C1C2, C-3C-2C-1, C-2C-1C0, C-1C0C1, C0C1C2, C1C2C3, wherein Cn represents a position of nth word following the current position, C-n represents a position of nth word prior to the current position, and n is any one of 0, 1, 2, and 3 (C0 represents that the extraction position is right the current position).

In other words, one or more the above feature template of the template function in the conditional random field model can be included according to the embodiment of the present disclosure.

Herein, C-2, C-1, C0, C1 and C2 are unary templates (Unigram), and as set forth, the "extraction position" has only one word.

Herein, C-2C-1, C-1C0, C0C1 and C1C2 are binary templates (Bigram), i.e., the "extraction position" has two words. For example, for the text "a young child is more likely to suffer from chicken pox", when the current position is the word "more", the words at the extraction position are "child" and "more" for the feature template of C-1C0, and the words (characters) at the extraction position are "like" and "ly" for the feature template of C1C2.

Similarly, C-3C-2C-1, C-2C-1C0, C-1C0C1, C0C1C2, and C1C2C3 are ternary templates (Trigram), i.e., the "extraction position" has three words. For example, for the text "a young child is more likely to suffer from chicken pox", when the current position is the word "more", the words at the extraction position are "young", "child", and "more" for the feature template of C-2C-1C0, and the words (characters) at the extraction position are "child", "more", and "like" for the feature template of C-1C0C1.

As can be seen from the above description, an "extraction position" may include the "current position" or an "extraction position" may be the "current position".

Meanwhile, even though the word of the current position is different, the same word (character) at the extraction position may be obtained depending on the feature templates of different template functions.

By setting reasonable feature templates, the relationship between texts can be analyzed from various views, so that the most reasonable score can be given collectively through a plurality of feature templates (feature functions) to each part-of-speech classification of each word (character).

For example, "Sugar Diabetes (also known as Diabetes Mellitus, caused by a relative or absolute deficiency of insulin and characterized by polyuria)" is a common name of disease. Thus a template function of the feature template of C0 can be employed to give a higher score of part-of-speech classification of "Name of Disease" to the word "Sugar" when the current position (and extraction position) is the word "Sugar".

However, there may be a text "I love sugar" in the target text, where "sugar" is not a name of disease. If only the template function corresponding to the feature template of C0 is employed, the word "sugar" may be mistaken as a "Name of Disease".

However, when there are multiple feature templates, because the word "sugar" in the text "I love sugar" is not followed by "Diabetes", the template functions corresponding to the feature templates of C1, C2, C0C1, C1C2, etc., usually do not give a higher score of the part-of-speech classification of "Name of Disease" to the word "sugar" therein.

Therefore, it can be ensured that the word "sugar" in the "Sugar Diabetes" finally obtains a higher total score corresponding to the part-of-speech classification of "Name of Disease" and is judged as a name of diseases, while the word "sugar" in the "I love sugar" will not. This is because only few feature templates give a higher score of the part-of-speech classification of "Name of Disease" but the total score of the part-of-speech classification of "Name of Disease" is not high.

In the embodiment of the present disclosure, the scoring function of the conditional random field model further includes a sememe function, which does not employ a feature template and a feature function but give a score of a specific part-of-speech classification corresponding to each character (or word) in a word (or phrase) according to matching conditions between the word (such as a to-be-matched word) in the target text and the sememe in the preset sememe library. Herein, for a word (or phrase) without matched sememe, the sememe function does not give a score (which can also be considered as a score of 0).

Herein, the "sememe library" is pre-summarized and includes a library of a large number of known sememes (e.g., a sememe library of a specific website), such as a Hownet knowledge base.

The sememe library includes a load of sememes and additional information associated with each sememe. For example, the additional information may include a serial number (ID) of the sememe, translation of the sememe (such as English translation), a type attribute (Father Information), and the like. Taking a sememe of "twitch" as an example, the additional information thereof may include: Father Information: pathological condition (No. 105), ID: 113 and English: twitch.

Herein, the above additional information includes the "type attribute (Father Information)" of the sememe, that is, "type", "attribute", "tag" and the like predetermined for the sememe in the sememe library. Obviously, in terms of meaning, the "type attribute" may have a certain correspondence with the "part-of-speech classification", and the correspondence may be manually set in advance.

Herein, the "type attribute" and the "part-of-speech classification" may have a one-to-one correspondence (of course, the name of the type attribute is not necessarily directly the same as that of the part-of-speech classification); alternatively, a plurality of "type attributes" may correspond to one "part-of-speech classification"; alternatively, each "type attribute" may correspond to a plurality of "part-of-speech classifications" or the like, which will not be described in detail herein.

For example, the "type attribute" may also include "Name of Disease"; alternatively, the "type attribute" may include "pathological condition", and the "type attribute" of the "pathological condition" is preset to correspond to the "part-of-speech classification" of "common symptom".

In some embodiments, the conditional random field model further comprises a word segmentation function configured to segment a plurality of to-be-matched words (or phrase) from the target text; and a sememe function configured to match each to-be-matched word (or phrase) with the sememe in a preset sememe library, and to give a score of the part-of-speech classification corresponding to the type attribute of the sememe in the sememe library for each character of each to-be-matched word (or phrase) when the to-be-matched word (or phrase) has the matched sememe.

In other words, the word segmentation processing can be performed on the target text through a preset word segmentation function to partition a plurality of words (or phrase) with independent relative meanings, i.e., a plurality of "to-be-matched words (or phrase)", from the target text and match the "to-be-matched words (or phrase)" with the sememes.

It could be seen that there is a high probability that a set of consecutive characters in the text is matched with a sememe but the consecutive characters is not actually a word. For example, in a text which recites "It's hot today", the consecutive characters "shot" is matched with a sememe but obviously not intended to represent the meaning of the word "shot" in the text, i.e., not a "word".

Therefore, the target text is processed in advance through the word segmentation function to obtain a to-be-matched word (or phrase) which is really a "word (or phrase)" in meaning, and the to-be-matched word is matched with the sememe. As such, the accuracy of the matching result can be ensured.

Of course, it should be understood that the to-be-matched words (or phrase) that are partitioned at this time are not necessarily all the to-be-classified words (or phrase) that are finally determined. For example, during the word segmentation, "diabetes" may be partitioned into a to-be-matched word (or phrase), but the word "diabetes" is located in "type-I diabetes" in the target text. Thus, it is possible that the "type-I diabetes" is finally determined to be a "to-be-classified word (or phrase)".

After the to-be-matched word (or phrase) are determined, the sememe library can be searched for a sememe which is literally completely the same as (matched with) the to-be-matched word (or phrase). If a certain to-be-matched word (or phrase) has a matched sememe, the presence of "part-of-speech classification" corresponding to "type attribute" of the sememe will be sought. If so, a score corresponding to the above part-of-speech classification will be given to each character (or word) in the to-be-matched word (or phrase).

For example, if the to-be-matched word obtained by segmenting the target text includes "Sugar Diabetes" and if the sememe library has the sememe in relation to "Sugar Diabetes" and the type attribute thereof also corresponds to the part-of-speech classification of "Name of Disease", then a score of 0.5 each corresponding to the part-of-speech classification of "Name of Disease" will be given to the words of "sugar" and "diabetes" in the target text.

Herein, since each to-be-matched word may or may not be matched with a sememe and there is no problem of "matching probability", the score corresponding to the part-of-speech classification given by the sememe function may be fixed (or may be calculated by "weight") during matching.

By providing the "sememe function", the sememes can be used to discover semantic features of related words.

For example, in the training text, "type-II diabetes" is classified as "Name of Disease" in part-of-speech classification, "diabetes" is a sememe, and the part-of-speech classification corresponding to the "attribute type" is also "Name of Disease". Therefore, for "type-I diabetes" in the target text, the sememe function can give a higher score of the part-of-speech classification corresponding to "Name of Disease" to "diabetes" therein, and then in combination with other scoring functions such as the template function, the conditional random field model is very likely to determine the "type-I diabetes" in the target text as "Name of Disease".

Of course, the conditional random field model may also include some other scoring functions.

For example, the conditional random field model may include a scoring function configured to judge whether a character is a punctuation (Punctuation: IsPunc), a scoring function configured to judge whether a character is a digit (Digits: Isdigits), a scoring function configured to judge whether a character is an alphabet (Alphabets: IsAlpha), a scoring function configured to judge whether a character is beginning of a sentence (Position of Char: Bos), a scoring function configured to judge whether a character is ending of a sentence (Position of Char: Eos), a scoring function configured to judge whether a character is a common suffix (Common Suffix), a scoring function configured to judge whether a character is a common prefix (Common Prefix), and the like.

These scoring functions may also affect the final processing result. For example, if a character is determined to be "punctuation" by a scoring function above, the character may be given a high score of the part-of-speech classification of "punctuation", thereby ensuring that the character is not considered a named entity. Or, if a character is determined to be "sentence head" by a scoring function above, the character and its previous character cannot be a to-be-classified word during the determination of the to-be-classified word.

Herein, the above scoring functions may be designed according to sklearn_crfsuite function of Python language, and will not be described in detail.

S103, determining the named entity in the target text according to the part-of-speech classification of the to-be-classified word.

According to the part-of-speech classification of the to-be-classified word in the obtained target text, the named entity in the target text and the part-of-speech classification corresponding to the named entity can be determined as a recognition result.

Herein, it should be understood that the above recognition result may be embodied in many different forms.

For example, the recognition result may be saved as a csv (comma separated value) file, where the target text is arranged in a column with one word (character) of the target text per row; and the part-of-speech classification is arranged in another column with a part-of-speech classification corresponding to the word (character) of the target text per row.

Specifically, when the part-of-speech classification of "Name of Disease" is denoted by symbol "S" and the part-of-speech classification of "Other" is denoted by symbol "Q", a specific saving form of the recognition result corresponding to the text of "as far as sugar diabetes is concerned" in the target text may be as follows:

| | |
|---|---|
| "(as far) as" | Q |
| "sugar" | S |
| "dia-" | S |
| "betes" | S |
| "is" | Q |
| "concerned" | Q |

As could be seen, the consecutive words (characters) "sugar", "dia-" and "betes" all correspond to the part-of-speech classification of "S", such that "sugar diabetes" can be recognized as a named entity and the part-of-speech classification thereof is the "Name of Disease".

It could be seen that, according to the embodiment of the present disclosure, during the determination of the part-of-speech classification, the matching condition between a word (or character) and a "sememe" and the type attribute of the sememe are used as one of reference factors. The "sememe" is a known word with a definite meaning, and the type attribute of the "sememe" is also predetermined. Therefore, firstly, an abstraction degree of keywords can be improved through a position relation of the sememes, so as to reduce a number of feature templates (template functions); secondly, semantic features of related words can be discovered by utilizing the sememe; again, a corpus of words with explicitly pointed sememes ("sememe library") helps to determine the type of naming (part-of-speech classification).

Meanwhile, by using a well-designed feature template (template function), abundant semantic information can be extracted from a small amount of annotated data, so that the amount of manually annotating data can be greatly reduced and the labor cost can be significantly saved.

In conclusion, the embodiment of the disclosure can improve the abstraction degree of the feature templates and reduce the number of the feature templates; therefore, on one hand, the speed of operation and training can be improved; on the other hand, the accuracy of named entity recognition can be improved. It has been found that the recognition accuracy according to the method of the embodiment of the disclosure can be up to 90% above by carrying out manual recognition on part of the target text recognized according to the method of the embodiment of the disclosure.

In some embodiments, the step of determining the named entity in the target text according to the part-of-speech classification of the to-be-classified word (or phrase) (S103) includes: extracting the to-be-classified word (or phrase) of part-of-speech classification in a predetermined field as the named entity.

As above, when it is desired to recognize a named entity in a certain predetermined field, only to-be-classified words corresponding to part-of-speech classifications associated with the predetermined field may be extracted as resulted named entities, and these named entities may be separately saved.

In some embodiments, the predetermined field is a medical field.

As above, the above predetermined field may specifically be the medical field.

Figure 2:
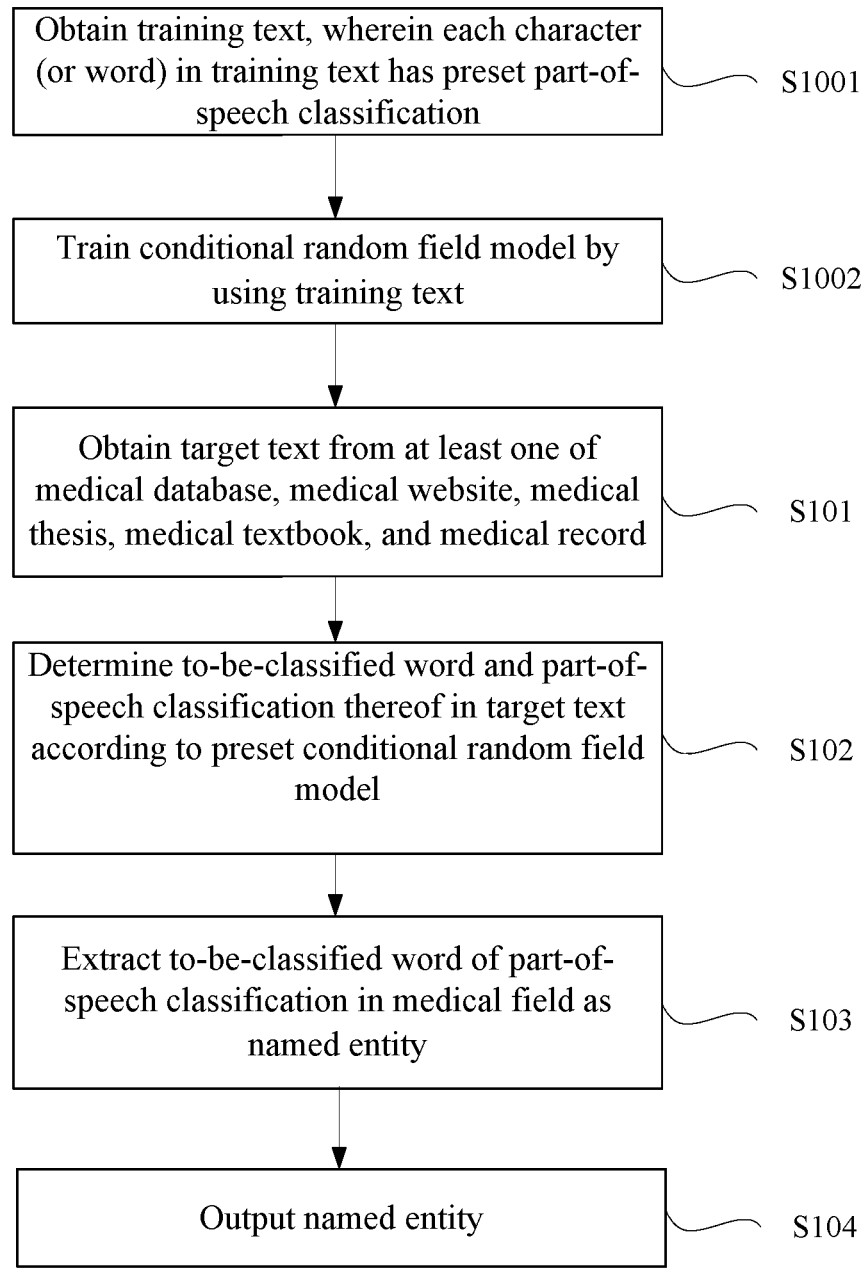
FIG. 2 is a flowchart illustrating another recognition method of named entity according to an embodiment of the present disclosure.

In some embodiments, referring to FIG. 2, the step of obtaining the target text (S101) includes: obtaining the target text from at least one of: a medical database, a medical website, a medical thesis, a medical textbook, and a medical record.

When it is desired to extract the named entities in the medical field, only content in the medical field can be selected as the target text to enhance the positive pertinence of the target text. The content in the medical field may specifically include a medical database, a medical website, a medical thesis, a medical textbook, a medical record, and the like.

For example, specifically, it can be prescribed that only content of "medical encyclopedia knowledge (as determined by a classification tag given by a website for encyclopedia knowledge entries)" are crawled to be the target text in the medical field.

In some embodiments, referring to FIG. 2, after the step of determining the named entity in the target text according to the part-of-speech classification of the to-be-classified word (S103), the method further includes:

S104, outputting the named entity.

After the named entity is recognized in the above manner, the identification result may also be output for subsequent use.

Herein, the above "output" manner may include: displaying the recognition result, broadcasting the recognition result in voice, printing out the recognition result, and transmitting the recognition result to other devices by copying/sending, for example, and will not be described in detail.

In some embodiments, referring to FIG. 2, before the step of determining the to-be-classified word or phrase and the part-of-speech classification of the to-be-classified word or phrase in the target text according to the preset conditional random field model (S102), the method further includes:

S1001, obtaining a training text, wherein each character (or word) in the training text has a preset part-of-speech classification; and S1002, training the conditional random field model by using the training text.

In other words, the above conditional random field (CRF) model may be derived by training.

Specifically, part of texts can be selected first, and corresponding part-of-speech classifications are manually annotated for each character (word) in the texts in a manual mode. Then the texts are used as training texts to train the conditional random field model.

Obviously, the field of the training text obtained at this time should be as similar as possible to the field of the named entity that is desired to be recognized.

For example, if there is a demand to recognize a named entity in the medical field, texts relating to the medical filed may be selected from the above medical database, medical website, medical thesis, medical textbook and medical record as the training text.

Specifically, the training process of the conditional random field model may be as follows:

processing the training text by using a current conditional random field model to obtain a processing result (part-of-speech classification of each character);

comparing the processing result (the recognition result) with a manually annotated result (i.e., comparing whether the part-of-speech classification provided by the conditional random field model is the same as the part-of-speech classification manually annotated);

adjusting parameters (mainly weights of the feature functions) in the conditional random field model according to differences between the recognition result and the result as manually annotated, and returning to the step of recognizing the training text by using the current conditional random field model; and repeating the steps to gradually perfect the conditional random field model and ending the training until an ending condition is met, such that the conditional random field model which can be directly applied subsequently is obtained.

Herein, the above ending conditions are various. For example, the ending condition may include that the accuracy of the recognition result of the current conditional random field model reaches a predetermined value (or converges), or the ending condition may include that the number of training cycles reaches a predetermined value, which will not be described in detail herein.

More specifically, the feature function of each template function is generated from the training text.

For example, for any of the above template functions, when the current position corresponds to a word or character in the training text, the word or character corresponding to the extraction position is determined. Then a plurality of feature functions may be generated, where a "predetermined part-of-speech classification" of each feature function is a possible part-of-speech classification, and "predetermined words" of all the feature functions are the same (i.e., the word or character corresponding to the extraction position). Through the traversal of the training text, a plurality of characteristic functions can be obtained at each word or character. Thus, if a total number of words or characters in the training text is n and a possible number of the part-of-speech classifications is L, the total number of feature functions generated during the training will be n*L.

The training process mainly adjusts the weights of the above feature functions. In other words, the weights of different feature functions can be increased or decreased according to the different correspondence and the occurrence times of "predetermined part-of-speech classification" and "predetermined characters or words". Finally it can be ensured that the processing result which basically conforms to the part-of-speech classification as manually annotated can be obtained when the conditional random field model processes the target text according to the adjusted weight.

For example, as mentioned above, since the content of "suffer from (the name of a disease)" often appears in the training text, a weight for a template function of C-2C-1 will be increased continuously after a feature function having a predetermined word of "suffer from" and a predetermined part-of-speech classification of "Name of Disease" is generated during the training process; in contrast, since the "suffer from" is almost impossibly followed by "Group of Disease", a weight will be continuously reduced or even up to negative after a feature function having a predetermined word of "suffer from" and a predetermined part-of-speech classification of "Group of Disease" is generated.

It should be understood, however, that the weight of the sememe function or the score as given may also be adjusted continuously during the above training process.

Therefore, the accurate recognition of the named entity can be realized through the comprehensive effect of the template functions and the sememe functions after the feature functions of the feature templates (template functions) are generated by training and the weights of the feature functions are adjusted.

Herein, the conditional random field model (CRF) belongs to a machine learning algorithm, equivalent to other deep learning algorithms. Since the conditional random field model requires a small amount of training, the training process can be completed by manually annotating a small amount of texts, and thus it is easy to implement and has high efficiency.

Of course, it is also feasible if the conditional random field model (CRF) is a "replica (the replica itself is untrained)" that is replicated by copying a trained conditional random field model stored in another storage medium.

In some embodiments, after the named entities are obtained, the relationships between different named entities can be further determined according to the named entities and the part-of-speech classifications corresponding thereto, such that a knowledge graph of the named entities can be established.

For example, the named entities obtained above can be used as "entities" in the knowledge graph, and the part-of-speech classifications of the named entities can be used as "attributes" of entities in the knowledge graph, so as to determine the entities included in the knowledge graph and the relationships (e.g., having the same attributes) between the entities by means of extraction, thereby obtaining the knowledge graph.

In some embodiments, each knowledge-graph may be a knowledge-graph in a predetermined field (e.g., a medical field), wherein the entities (named entities) and attributes (part-of-speech classifications) are associated with the predetermined field.

Figure 3:
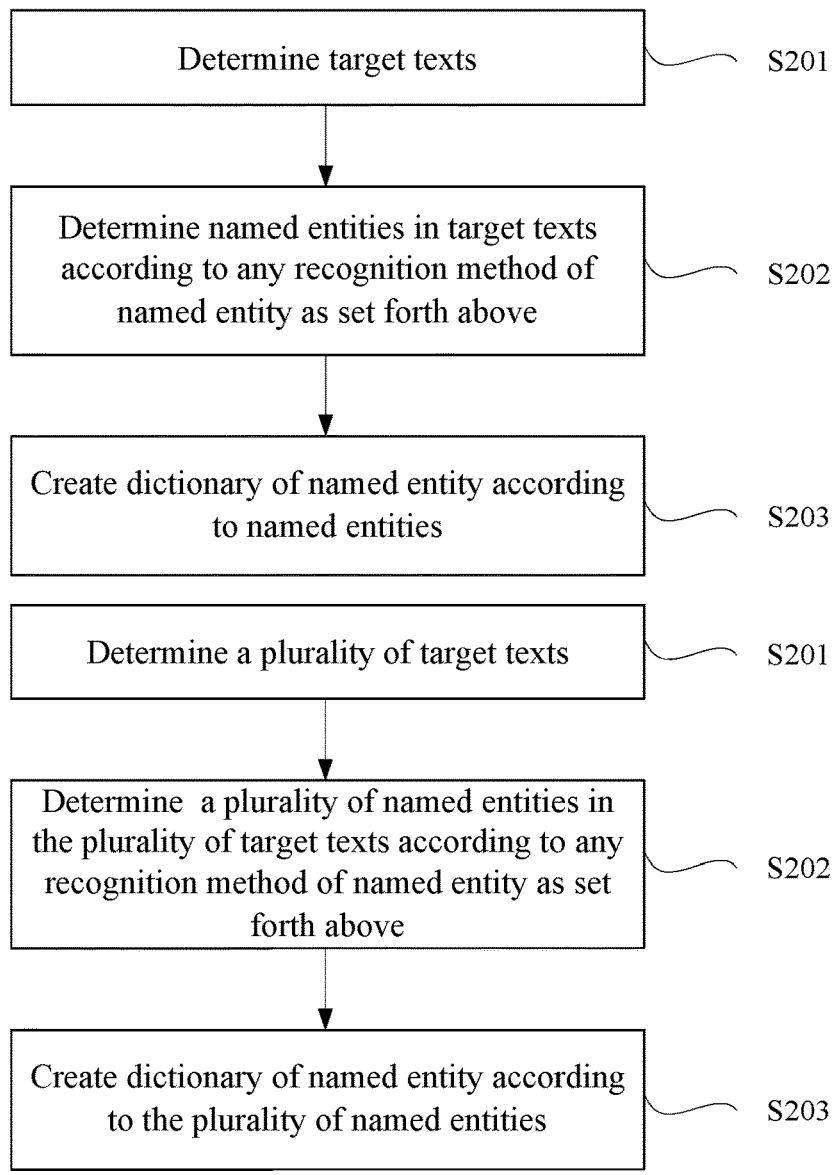
FIG. 3 is a flowchart illustrating a creation method of a dictionary of the named entity according to an embodiment of the present disclosure.

In a second aspect, referring to FIG. 3, an embodiment of the present disclosure provides a creation method of a dictionary of named entity, including:

S201, determining a plurality of target texts.

The texts (target texts) from which the named entity is obtained are determined and a dictionary of named entity is established.

Herein, the above content to be "determined" may be some target texts to be processed which are designated by a person or some target texts to be processed which are obtained by crawling, for example.

S202, determining a plurality of named entities in the plurality of target texts according to any recognition method of named entity as set forth above.

In the recognition method of named entity according to the embodiment of the disclosure, the named entities and part-of-speech classifications of the named entities are determined from the target texts.

S203, creating the dictionary of named entity according to the plurality of named entities.

Based on the named entities and their part-of-speech classifications as determined above, some of the named entities are grouped together to form a relatively independent database, i.e., to form the "dictionary of named entity".

In some embodiments, the words or characters in each dictionary of named entity may all have the same part-of-speech classification.

For example, the named entities having a part-of-speech is classification of "Name of Disease" may all be added to a dictionary of named entity to obtain a "Dictionary of Diseased Name", and the named entities having a part-of-speech classification of "Group of Disease" may be added to a dictionary of named entity to obtain a "Dictionary of Diseased Group".

It should be understood that when the words in the dictionary of named entity all have the same part-of-speech classification, then the dictionary of named entity may store only the named entities (i.e., words) therein without storing their part-of-speech classifications (i.e., attributes of the words), such that by a name of the dictionary of named entity, the part-of-speech classifications of the named entities therein can be collectively represented.

In some embodiments, the part-of-speech classifications of words in each dictionary of named entity may also all belong to a predetermined field.

For example, the named entities in the medical field having part-of-speech classifications of "Name of Disease", "Group of Disease", "Diseased Site", "Etiology", "Common Symptom", "Consultation Department", "propagation Route", "Physiological Index", "Examination Means" and "Treatment Means", and the like, may be added to a dictionary of named entity to obtain a "medical dictionary".

In some embodiments, the part-of-speech classification of the words (or phrase) in each dictionary of named entity may also belong to different fields, i.e., the dictionary of named entity may be a "comprehensive dictionary".

It should be understood that when words (or phrase) in the dictionary of named entity have different part-of-speech classifications, then the dictionary of named entity can store both the named entities (i.e., the words or phrase) and their part-of-speech classifications (i.e., the attributes of the words or phrase).

Since the amount of data is much large, the accuracy rate reaches up to 90% above when sampling inspection is performed on the dictionary of named entity established according to the method of the embodiments of the disclosure. For example, as for some English medicine names or inspection modes, manual work needs to inquiry and verify some materials while the embodiments of the disclosure can substantially realize accurate reorganization.

Figure 4:
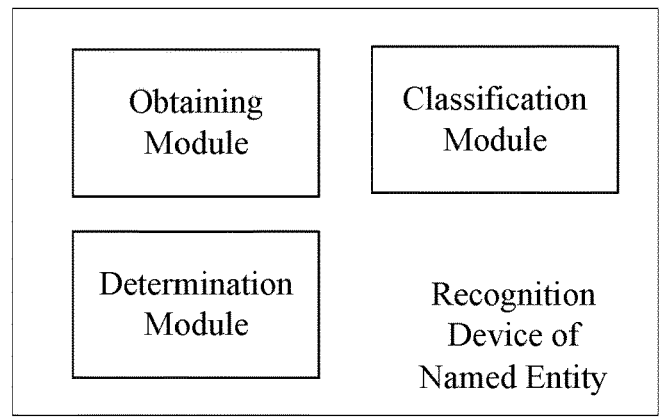
FIG. 4 is a block diagram illustrating a recognition device of named entity according to an embodiment of the present disclosure.

In a third aspect, referring to FIG. 4, an embodiment of the present disclosure provides a recognition device of named entity, including: an obtaining module, a classification module and a determination module.

The obtaining module is configured to obtain a target text.

The classification module is configured to determine a to-be-classified word (or phrase) and a part-of-speech classification of the to-be-classified word (or phrase) in the target text according to a preset conditional random field model, wherein the conditional random field model includes a plurality of scoring functions, the scoring function including an sememe function and at least one template function; each template function is configured to provide a score for each character (or word) corresponding to each part-of-speech classification in the target text; the sememe function is configured to match at least part of a word (or words or phrase) in the target text with a sememe in a preset sememe library, and give a score of part-of-speech classification corresponding to a type attribute of the sememe in the sememe library for each character (or word) of the word (or phrase) when the word (or phrase) has a matched sememe; the conditional random field model is configured to determine the part-of-speech classification of each character according to a total score of each character (or word) corresponding to each part-of-speech classification in the target text, wherein the total score of any character (or word) corresponding to any part-of-speech classification is a sum of the scores of the character (or word) corresponding to the part-of-speech classification given by all the scoring functions; the conditional random field model is further configured to determine a plurality of characters (or words) having the same part-of-speech classification as a to-be-classified word (or phrase), and determine the part-of-speech classification of each to-be-classified word (or phrase) as the part-of-speech classification of any characters (or words) in the to-be-classified word (or phrase).

The determination module is configured to determine a named entity in the target text according to the part-of-speech classification of the to-be-classified word (or phrase).

The recognition device of named entity according to the embodiment of the disclosure can realize the above recognition method of named entity.

In some embodiments, the determination module is configured to extract the to-be-classified word (or phrase) of the part-of-speech classification in a predetermined field as the named entity.

The determination module in the recognition device of named entity according to the embodiment of the disclosure can specifically extract the named entities in a predetermined field (such as a medical field).

Figure 5:
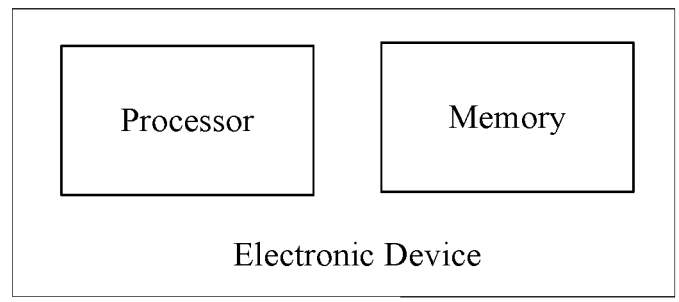
FIG. 5 is a block diagram of an electronic device according to an embodiment of the disclosure.

In a fourth aspect, referring to FIG. 5, an embodiment of the present disclosure provides an electronic device, including:

one or more processors; and a memory, storing one or more programs thereon, wherein when executed by the one or more processors, the one or more programs cause the one or more processors to implement any recognition method of named entity as set forth above.

The electronic device according to the embodiment of the present disclosure can implement the recognition method of named entity as set forth above.

Figure 6:
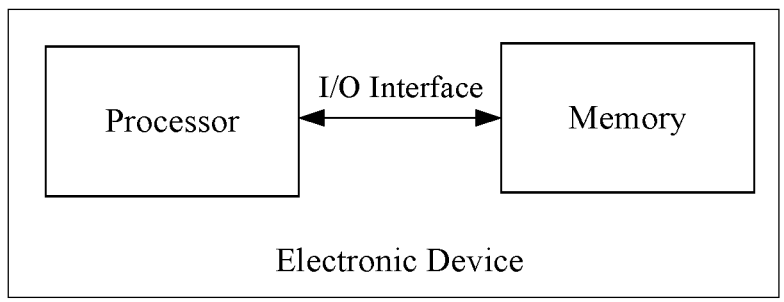
FIG. 6 is a block diagram of another electronic device according to an embodiment of the disclosure.

In some embodiments, referring to FIG. 6, the electronic device according to the embodiments of the present disclosure further includes one or more I/O interfaces, connecting the processor to the memory and configured to implement information interaction between the processor and the memory.

In the electronic device of the embodiment of the present disclosure, the I/O interface can also be provided to implement data interaction between the processor and the memory.

Herein, the processor is a device having data processing capability, which includes but is not limited to a Central Processing Unit (CPU), for example; the memory is a device having data storage capability, which includes but not limited to Random Access Memory (RAM, more specifically SDRAM and DDR), Read Only Memory (ROM), Electrically Erasable Programmable Read Only Memory (EEPROM), and flash memory (FLASH); the I/O interface (read/write interface) connects the processor and the memory to realize the information interaction between the memory and the processor, which includes but is not limited to a data bus (Bus), for example.

Figure 7:
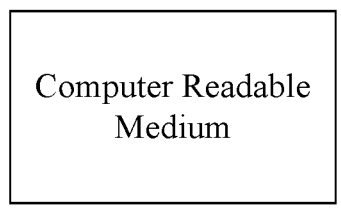
FIG. 7 is a block diagram of a computer-readable medium according to an embodiment of the disclosure.

In a fifth aspect, referring to FIG. 7, an embodiment of the present disclosure provides a computer readable medium, storing a computer program thereon, wherein when executed by a processor, the program implements any recognition method of named entity as set forth above.

The embodiment of the disclosure provides a computer readable medium, wherein a program in the computer readable medium, when executed, can implement the recognition method of named entity as set forth above.

It will be appreciated by one person having ordinary skill in the art that all or some of the steps, systems or functional modules/units in the devices as disclosed above may be implemented as software, firmware, hardware, and suitable combinations thereof.

In a hardware implementation, the division between functional modules/units mentioned in the above description does not necessarily correspond to division of physical components; for example, a single physical component may have multiple functions, or a single function or step may be performed by several physical components in cooperation.

Some or all of the physical components may be implemented as software executed by a processor, such as a Central Processing Unit (CPU), digital signal processor, or microprocessor, or as hardware, or as an integrated circuit, such as an application-specific integrated circuit. Such software may be distributed on computer readable media, which may include computer storage media (or non-transitory media), and communication media (or transitory media). The term "computer storage media" includes volatile and nonvolatile, removable and non-removable media implemented in any method or technology for storage of information (such as, computer readable instructions, data structures, program modules or other data), as is well known to those skilled in the art. The computer storage media includes, but is not limited to, Random Access Memory (RAM, more specifically SDRAM and DDR, for example), Read Only Memory (ROM), Electrically Erasable Programmable Read Only Memory (EEPROM), flash memory (FLASH), or other disk storage; compact disk read only memory (CD-ROM), Digital Versatile Disk (DVD), or other optical disk storage; magnetic cassettes, magnetic tape, magnetic disk storage or other magnetic storage; any other medium which can be used to store desired information and which can be accessed by a computer. In addition, the communication media typically embodies computer readable instructions, data structures, program modules or other data in a modulated data signal such as a carrier wave or other transport mechanism and includes any information delivery media, as is well known to those skilled in the art.

The disclosure has provided example embodiments. Although specific terms are employed, they are used and should be interpreted in a generic and descriptive sense only and not for purposes of limitation. In some instances, features, characteristics and/or elements described in connection with a particular embodiment may be used alone or in combination with features, characteristics and/or elements described in connection with other embodiments, unless expressly stated otherwise, as would be apparent to those skilled in the art. It will, therefore, be understood by those skilled in the art that various changes in form and details may be made without departing from the scope of the disclosure as set forth in the appended claims.

The invention claimed is:

1. A recognition method of named entity applied to a recognition device of named entity, the device comprising a memory configured to store computer executable instructions and a processor configured to execute the computer executable instructions to implement the method, the method comprising steps of:
   receiving a target text including the named entity;
   determining a to-be-classified word and a part-of-speech classification of the to-be-classified word in the target text according to a preset conditional random field model, wherein the conditional random field model includes a plurality of scoring functions, each scoring function including an sememe function and at least one template function; each template function is configured to provide a score for each character corresponding to each part-of-speech classification in the target text; the sememe function is configured to match at least part of a word in the target text with a sememe in a preset sememe library, and give a score of part-of-speech classification corresponding to a type attribute of the sememe in the sememe library for each character of the word when the word has a matched sememe; the conditional random field model is configured to determine the part-of-speech classification of each character according to a total score of each character corresponding to each part-of-speech classification in the target text, wherein the total score of any character or word corresponding to any part-of-speech classification is a sum of the scores of the character corresponding to the part-of-speech classification given by all the scoring functions; the conditional random field model is further configured to determine a plurality of characters having the same part-of-speech classification as a to-be-classified word, and determine the part-of-speech classification of each to-be-classified word as the part-of-speech classification of any characters in the to-be-classified word; and
   determining the named entity in the target text according to the part-of-speech classification of the to-be-classified word.

2. The method according to claim 1, wherein
   each template function has a feature template and a plurality of feature functions, each feature template specifies an extraction position having a determined positional relationship with a current position, and any two of the template functions have different feature templates; and wherein
   each template function is configured to successively enable each character in the target text to be at the current position; when any character or word is at the current position, each feature function is configured to judge a matching status of the character or word at the extraction position with a preset word specified by the feature function, to give a preset score corresponding to a preset part-of-speech classification to the character or word at the current position.

3. The method according to claim 2, wherein the extraction position specified by each feature template is any one of:
   C-2, C-1, C0, C1, C2, C-2C-1, C-1C0, C0C1, C1C2, C-3C-2C-1, C-2C-1C0, C-1C0C1, C0C1C2, C1C2C3,
   wherein Cn represents a position of the nth word after the current position, C-n represents a position of the nth word before the current position, and n is any one of 0, 1, 2, and 3.

4. The method according to claim 3 wherein the conditional random field model further comprises: a scoring function configured to judge whether a character is a punctuation, a scoring function configured to judge whether a character is a digit, a scoring function configured to judge whether a character is an alphabet, a scoring function configured to judge whether a character is beginning of a sentence, a scoring function configured to judge whether a character is ending of a sentence, a scoring function configured to judge whether a character is a common suffix, and a scoring function configured to judge whether a character is a common prefix.

5. The method according to claim 1, wherein the step of determining the to-be-classified word and the part-of-speech classification of the to-be-classified word in the target text according to the preset conditional random field model wherein the conditional random field model is configured to determine the part-of-speech classification of each character according to a total score of each character corresponding to each part-of-speech classification in the target text comprises:
   determining a maximum total score in all the total scores corresponding to each character in the target text; and
   using the part-of-speech classification corresponding to the maximum total score as the part-of-speech classification of the character or word.

6. The method according to claim 1, wherein
   the conditional random field model further comprises a word segmentation function configured to segment a plurality of to-be-matched words from the target text; and
   a sememe function configured to match each to-be-matched word with the sememe in a preset sememe library, and to give a score of the part-of-speech classification corresponding to the type attribute of the sememe in the sememe library for each character or word of each to-be-matched word or phrase when the to-be-matched word or phrase has the matched sememe.

7. The method according to claim 1, wherein the step of determining the named entity in the target text according to the part-of-speech classification of the to-be-classified word comprises:
   extracting the to-be-classified word of part-of-speech classification in a predetermined field as the named entity.

8. The method according to claim 7, wherein
   the predetermined field is a medical field.

9. The method according to claim 1, wherein the step of receiving the target text including the named entity comprises:
   receiving the target text from at least one of: a medical database, a medical website, a medical thesis, a medical textbook, and a medical record.

10. The method according to claim 1, wherein after the step of determining the named entity in the target text according to the part-of-speech classification of the to-be-classified word, the method further comprises:
    outputting the named entity.

11. The method according to claim 1, wherein before the step of determining the to-be-classified word and the part-of-speech classification of the to-be-classified word in the target text according to the preset conditional random field model, the method further comprises:
    obtaining a training text, wherein each character in the training text has a preset part-of-speech classification; and
    training the conditional random field model by using the training text.

12. A creation method of a dictionary of named entity, the method comprising:
    determining a plurality of target texts;
    determining a plurality of named entities in the plurality of target texts according to the recognition method of named entity according to claim 1; and
    creating the dictionary of named entity according to the plurality of named entities.

13. A recognition device of named entity, the device comprising:
    an obtaining circuit, configured to receive a target text including the named entity;
    a classification circuit, configured to determine a to-be-classified word and a part-of-speech classification of the to-be-classified word in the target text according to a preset conditional random field model, wherein the conditional random field model includes a plurality of scoring functions, each scoring function including an sememe function and at least one template function; each template function is configured to provide a score for each character corresponding to each part-of-speech classification in the target text; the sememe function is configured to match at least part of a word in the target text with a sememe in a preset sememe library, and give a score of part-of-speech classification corresponding to a type attribute of the sememe in the sememe library for each character of the word when the word has a matched sememe; the conditional random field model is configured to determine the part-of-speech classification of each character according to a total score of each character corresponding to each part-of-speech classification in the target text, wherein the total score of any character or word corresponding to any part-of-speech classification is a sum of the scores of the character or word corresponding to the part-of-speech classification given by all the scoring functions; the conditional random field model is further configured to determine a plurality of characters or words having the same part-of-speech classification as a to-be-classified word, and determine the part-of-speech classification of each to-be-classified word as the part-of-speech classification of any characters in the to-be-classified word; and
    a determination circuit, configured to determine the named entity in the target text according to the part-of-speech classification of the to-be-classified word.

14. The device according to claim 13, wherein
    the determination circuit is configured to extract the to-be-classified word of the part-of-speech classification in a predetermined field as the named entity.

15. An electronic device, the electronic device comprising:
    one or more processors; and
    a memory, storing one or more programs thereon, wherein when executed by the one or more processors, the one or more programs cause the one or more processors to implement a recognition method of named entity, the method comprising:
    receiving a target text including the named entity;
    determining a to-be-classified word and a part-of-speech classification of the to-be-classified word in the target text according to a preset conditional random field model, wherein the conditional random field model includes a plurality of scoring functions, each scoring function including an sememe function and at least one template function; each template function is configured to provide a score for each character corresponding to each part-of-speech classification in the target text; the sememe function is configured to match at least part of a word in the target text with a sememe in a preset sememe library, and give a score of part-of-speech classification corresponding to a type attribute of the sememe in the sememe library for each character of the word when the word has a matched sememe; the conditional random field model is configured to determine the part-of-speech classification of each character according to a total score of each character corresponding to each part-of-speech classification in the target text, wherein the total score of any character or word corresponding to any part-of-speech classification is a sum of the scores of the character corresponding to the part-of-speech classification given by all the scoring functions; the conditional random field model is further configured to determine a plurality of characters having the same part-of-speech classification as a to-be-classified word, and determine the part-of-speech classification of each to-be-classified word as the part-of-speech classification of any characters in the to-be-classified word; and determining the named entity in the target text according to the part-of-speech classification of the to-be-classified word.

16. A non-transitory computer-readable medium, storing a computer program thereon, wherein when executed by a processor, the program implements the recognition method of named entity according to claim 1.

17. The method according to claim 2, wherein the step of determining the to-be-classified word and the part-of-speech classification of the to-be-classified word in the target text according to the preset conditional random field model wherein the conditional random field model is configured to determine the part-of-speech classification of each character according to a total score of each character corresponding to each part-of-speech classification in the target text comprises:

determining a maximum total score in all the total scores corresponding to each character in the target text; and using the part-of-speech classification corresponding to the maximum total score as the part-of-speech classification of the character or word.

18. The method according to claim 2, wherein the conditional random field model further comprises a word segmentation function configured to segment a plurality of to-be-matched words from the target text; and a sememe function configured to match each to-be-matched word with the sememe in a preset sememe library, and to give a score of the part-of-speech classification corresponding to the type attribute of the sememe in the sememe library for each character or word of each to-be-matched word or phrase when the to-be-matched word or phrase has the matched sememe.

19. The method according to claim 2, wherein the step of determining the named entity in the target text according to the part-of-speech classification of the to-be-classified word comprises:

extracting the to-be-classified word of part-of-speech classification in a predetermined field as the named entity.

20. The method according to claim 19, wherein the predetermined field is a medical field, the step of receiving the target text including the named entity comprises: obtaining the target text from at least one of: a medical database, a medical website, a medical thesis, a medical textbook, and a medical record, after the step of determining the named entity in the target text according to the part-of-speech classification of the to-be-classified word, the method further comprises: outputting the named entity, and before the step of determining the to-be-classified word and the part-of-speech classification of the to-be-classified word in the target text according to the preset conditional random field model, the method further comprises: obtaining a training text, wherein each character in the training text has a preset part-of-speech classification; and training the conditional random field model by using the training text.

\* \* \* \* \*